US009538035B2

(12) United States Patent
Minamino

(10) Patent No.: US 9,538,035 B2
(45) Date of Patent: Jan. 3, 2017

(54) FIRMWARE-REWRITABLE IMAGE FORMING APPARATUS

(71) Applicant: KYOCERA Document Solutions Inc., Osaka-shi, Osaka (JP)

(72) Inventor: Koji Minamino, Osaka (JP)

(73) Assignee: KYOCERA Document Solutions Inc., Osaka-shi (JP)

(*) Notice: Subject to any disclaimer, the term of this patent is extended or adjusted under 35 U.S.C. 154(b) by 0 days.

(21) Appl. No.: 14/975,391

(22) Filed: Dec. 18, 2015

(65) Prior Publication Data

US 2016/0182758 A1    Jun. 23, 2016

(30) Foreign Application Priority Data

Dec. 19, 2014    (JP) .................................. 2014-256944

(51) Int. Cl.
*G06F 3/12* (2006.01)
*H04N 1/00* (2006.01)

(52) U.S. Cl.
CPC ................................ *H04N 1/00962* (2013.01)

(58) Field of Classification Search
None
See application file for complete search history.

(56) References Cited

U.S. PATENT DOCUMENTS

| 6,754,723 | B2* | 6/2004 | Kato | G06K 15/00 |
| | | | | 709/217 |
| 8,051,218 | B2* | 11/2011 | Ferlitsch | G03G 15/5075 |
| | | | | 358/3.22 |
| 2003/0214657 | A1* | 11/2003 | Stringham | H04L 67/02 |
| | | | | 358/1.1 |

FOREIGN PATENT DOCUMENTS

JP      2004110396 A    4/2004

* cited by examiner

*Primary Examiner* — Paul F Payer
(74) *Attorney, Agent, or Firm* — Alleman Hall McCoy Russell & Tuttle LLP

(57) ABSTRACT

An image forming apparatus includes an environment obtaining portion, a storage portion, an environment determination portion, a firmware selection portion, and a firmware rewriting portion. The environment obtaining portion obtains environment information from an environmental sensor. In the storage portion, an environmental condition table and a firmware table are stored. In the environmental condition table, in association with registered environment information indicating a specific environment, identification information for identifying the specific environment is stored. In the firmware table, in association with the identification information, firmware that corresponds to an environmental condition indicated by the identification information is stored.

The environment determination portion determines whether the obtained environment information corresponds to the registered environment information. Based on the firmware table and on the identification information, the firmware selection portion selects firmware that corresponds to the identification information. The firmware rewriting portion rewrites currently-used firmware with the selected firmware.

2 Claims, 4 Drawing Sheets

FIG. 4A

| ID | REGISTRATION DURATION | REGISTERED ENVIRONMENT INFORMATION | | | |
|---|---|---|---|---|---|
| | | Low temperature (0 degrees or lower) | High temperature (30 degrees or higher) | High temperature, high humidity (30 degrees or higher, 80% or higher) | ... | Normal temperature, normal humidity (higher than 0 degrees, lower than 30 degrees, lower than 80%) |
| A | Two days or longer | | | | |
| B | Two days or longer | | | | |
| C | One day or longer | | | | |
| ... | ... | | | | |
| Z | Three days or longer | | | | |

400 — 401 REGISTERED ENVIRONMENT INFORMATION; 402 REGISTRATION DURATION; 403 ID

FIG. 4B

| ID | FIRMWARE |
|---|---|
| A | aaa |
| B | bbb |
| C | ccc |
| ... | ... |
| Z | zzz |

404 — 405 ID; 406 FIRMWARE

FIRMWARE-REWRITABLE IMAGE FORMING APPARATUS

INCORPORATION BY REFERENCE

This application is based upon and claims the benefit of priority from the corresponding Japanese Patent Application No. 2014-256944 filed on Dec. 19, 2014, the entire contents of which are incorporated herein by reference.

BACKGROUND

The present disclosure relates to an image forming apparatus.

Conventionally, there are technologies for appropriately downloading firmware to image forming apparatuses such as multifunction peripherals, copying machines, and printers.

For example, a technology is known in which in the case where an image processing apparatus connected to a network is to rewrite firmware, if an administrator obtains information regarding the latest version thereof from a website, the image processing apparatus downloads the latest firmware based on the information, to update the firmware for the image forming apparatus.

However, the technology described above can download only the latest firmware. In addition, the above technology cannot download appropriate firmware in accordance with the environmental condition of the image forming apparatus.

Since the image forming apparatus is very sensitive to the influence of the ambient environmental condition during operation, the performance of the image forming apparatus greatly changes depending on the installation environment and the seasonal condition. Therefore, the image forming apparatus has incorporated a correction control function therein so as to be able to ensure constant quality under an environment within a specific condition range even if some change has occurred in the environmental condition.

However, if the environment is within the specific condition range, the above-described correction control can be performed by use of regular firmware, but the environment is outside the specific condition range, the correction control cannot be performed by use of the regular firmware. Thus, there are cases where the manufacturer creates firmware that is dedicated to such specific environment and that includes the correction control function, and releases the dedicated firmware on the website.

SUMMARY

An image forming apparatus according to an aspect of the present disclosure includes an environment obtaining portion, a storage portion, an environment determination portion, a firmware selection portion, and a firmware rewriting portion. The environment obtaining portion obtains, from an environmental sensor, environment information regarding an ambient environment of the image forming apparatus. In the storage portion, an environmental condition table and a firmware table are stored. In the environmental condition table, in association with registered environment information indicating a specific environment, identification information for identifying the specific environment is stored. In the firmware table, in association with the identification information, firmware that corresponds to an environmental condition indicated by the identification information is stored. Based on the environmental condition table, the environment determination portion determines whether the obtained environment information corresponds to the registered environment information. Based on the firmware table and on the identification information associated with the registered environment information, the firmware selection portion selects firmware that corresponds to the identification information, when the environment information corresponds to the registered environment information. The firmware rewriting portion rewrites currently-used firmware with the selected firmware and executes restart.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4A shows one example of an environmental condition table in the embodiment of the present disclosure.

FIG. 4B shows one example of a firmware table in the embodiment of the present disclosure.

DETAILED DESCRIPTION

Hereinafter, an embodiment of an image forming apparatus according to the present disclosure will be described with reference to the accompanying drawings, for understanding of the present disclosure. It should be noted that the following embodiment is an example embodying the present disclosure, and, by nature, does not limit the technical scope of the present disclosure. The alphabet S before each number in the flow chart represents "step".

As an example of the embodiment of the present disclosure, an image forming apparatus 100 will be described below. The image forming apparatus 100 of the present disclosure corresponds, for example, to a multifunction peripheral (MFP) that has functions of a facsimile machine, a copying machine, a scanner, a printer, and the like.

Figure 1:
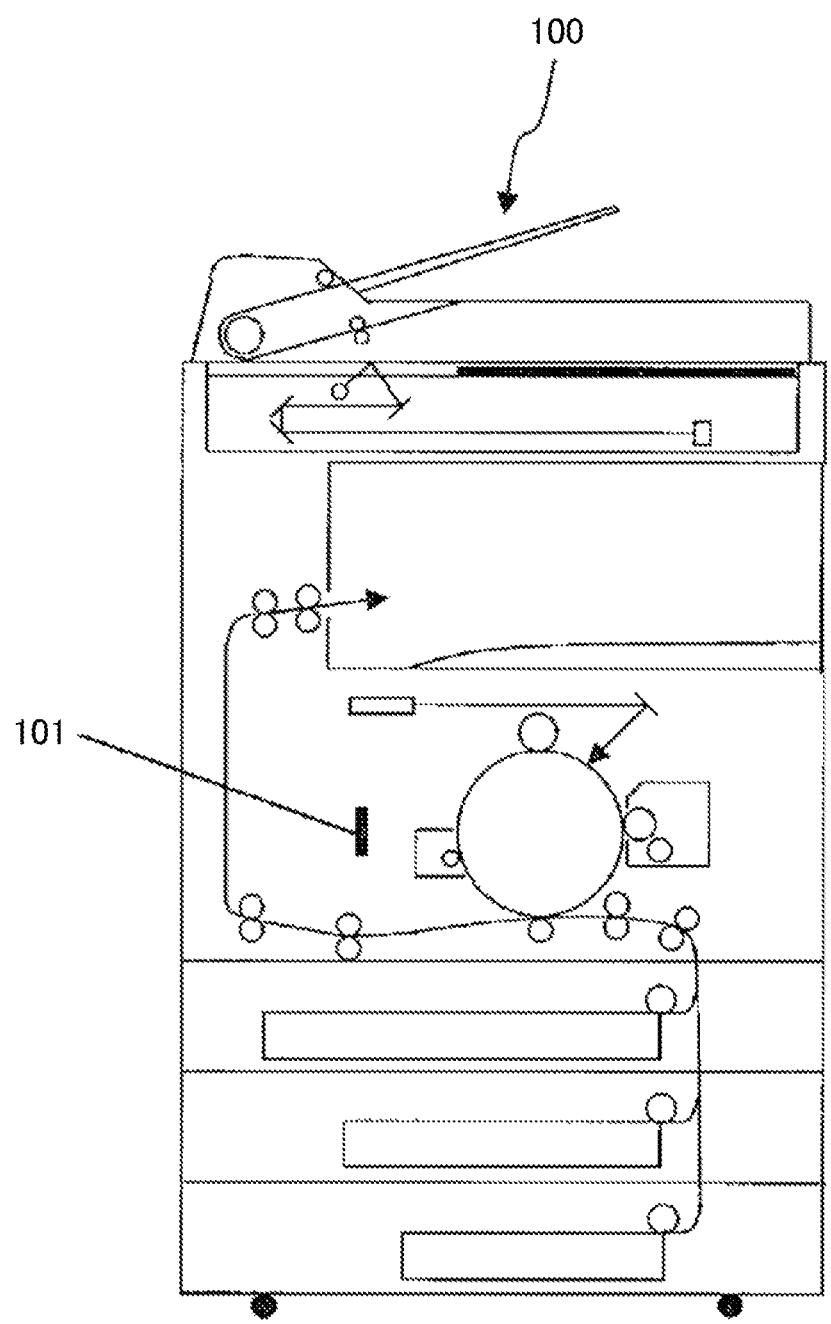
FIG. 1 shows the entire configuration of the inside of an image forming apparatus according to an embodiment of the present disclosure.

As shown in FIG. 1, when the image forming apparatus 100 has received a set condition for a printing job from a user via an operation portion, the image forming apparatus 100 drives portions such as an image reading portion, an image processing portion, a conveying portion, a fixing portion, and the like, to provide the printing job. In the vicinity of the image processing portion or the fixing portion of the image forming apparatus 100, an environmental sensor 101 which measures the environmental condition (for example, temperature, humidity, etc.) of the image forming apparatus 100 is provided.

Figure 2:
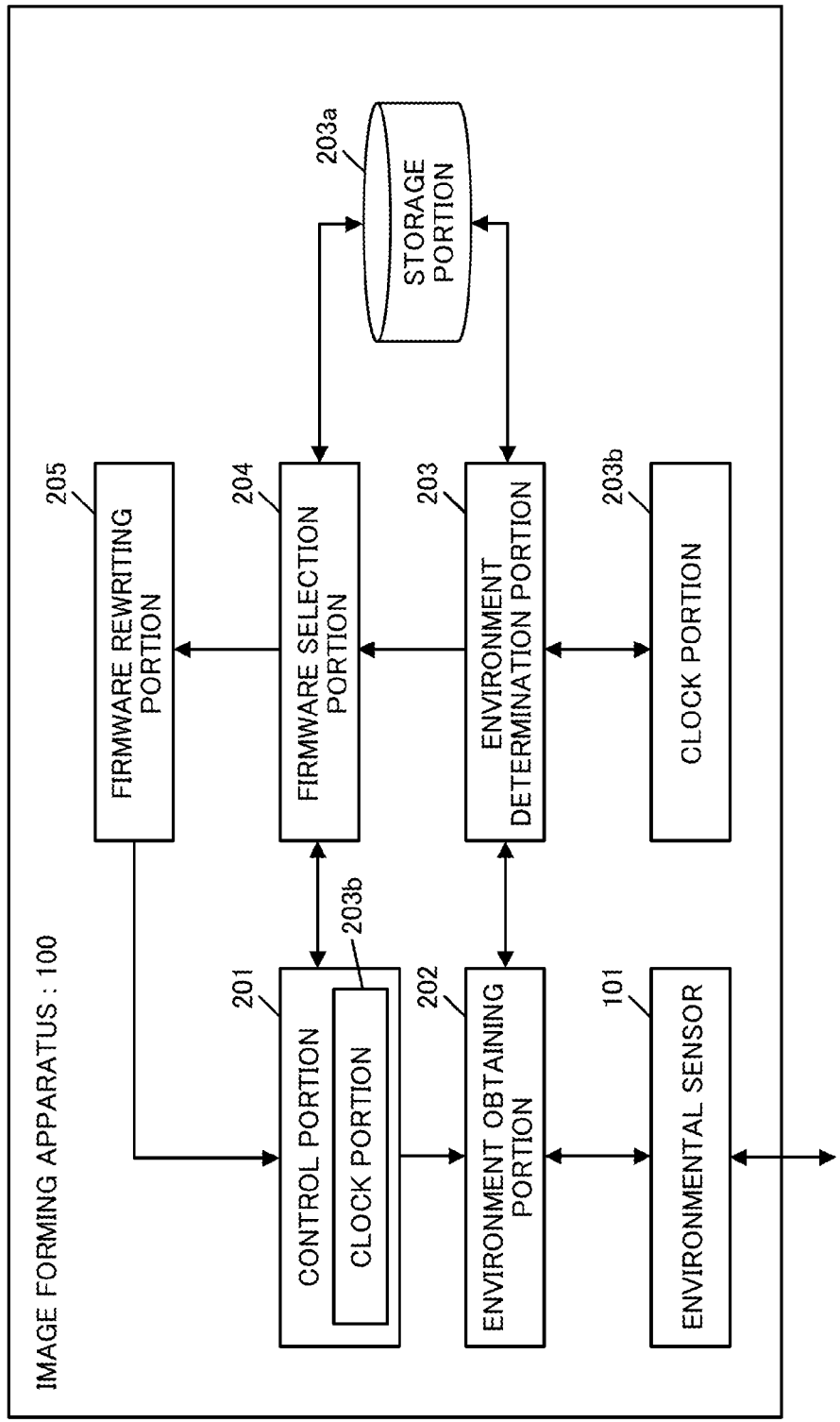
FIG. 2 shows functional blocks of the image forming apparatus according to the embodiment of the present disclosure.

The image forming apparatus 100 includes a control portion 201 (see FIG. 2). A control circuit of the control portion 201 includes: a central processing unit (CPU); a read only memory (ROM); a random access memory (RAM); a hard disk drive (HDD); drivers corresponding to respective drive portions; and the like, and the devices are connected via an internal bus.

The CPU of the image forming apparatus 100 uses the RAM as a work area, for example, and executes programs stored in the ROM, the HDD, and the like. The CPU receives data from drivers based on the result of the execution, receives inputted instruction information, a control signal, a command signal, and the like, and controls the operation of each drive portion regarding the execution of the printing job. Also with respect to portions (shown in FIG. 2) other than the drive portions and to be described later, the CPU realizes such portions by executing programs. In the ROM, the RAM, the HDD, and the like, programs and data for realizing portions described below are stored.

Next, with reference to FIG. 2 and FIG. 3, the configuration and the execution procedure according to the embodiment of the present disclosure will be described. First, when the user turns on the power supply of the image forming apparatus 100, the control portion 201 of the image forming apparatus 100 starts each portion and notifies an environment obtaining portion 202 that operation is ready to be performed. Upon receiving the notification, the environment obtaining portion 202 starts the environmental sensor 101 (FIG. 3: S101). Then, the environment obtaining portion 202 obtains environment information detected by the environmental sensor 101 (FIG. 3: S102). The environment information means information regarding the ambient environment of the image forming apparatus 100, and is temperature, humidity, atmospheric pressure, and the like, for example.

Upon obtaining the environment information, the environment obtaining portion 202 notifies environment determination portion 203 that the environment obtaining portion 202 has obtained the environment information. Upon receiving the notification, the environment determination portion 203 determines whether the obtained environment information corresponds to registered environment information 401 indicating a specific environment (FIG. 3: S103). Specifically, the environment determination portion 203 determines whether the environment information is included in the registered environment information 401.

There is no limitation in particular to how the environment determination portion 203 makes the determination. For example, the environment determination portion 203 refers to an environmental condition table 400 stored in advance in a specific storage portion 203a. In the environmental condition table 400, as shown in FIG. 4A, the registered environment information 401 indicating a specific environment, a registration duration 402 indicating the period for which the condition indicated by the registered environment information 401 has continued, and identification information (ID) 403 for identifying the specific environment are stored in association with one another. Here, the specific environment includes: an abnormal environment in which a printed object having constant quality cannot be outputted unless dedicated firmware that includes a correction control function is executed; normal environment in which a printed object having the constant quality can be outputted even by use of normal firmware; and the like. In the environmental condition table 400 shown in FIG. 4A, in the case where the registered environment information 401 is "low temperature (0 degrees or lower)", for example, "two days or longer" is stored as the registration duration 402. In the case where the registered environment information 401 is "high temperature (30 degrees or higher)", "two days or longer" is stored as the registration duration 402. In the case where the registered environment information 401 is "high temperature and high humidity (30 degrees or higher, 80% or higher)", "one day or longer" is stored as the registration duration 402. In the case where the registered environment information 401 is "normal temperature, normal humidity (higher than 0 degrees, lower than 30 degrees, lower than 80%), "three days or longer" is stored as the registration duration 402. These combinations can be changed as appropriate as a design.

The environment determination portion 203 checks the environment information (for example, temperature, humidity) obtained by the environmental sensor 101 against the registered environment information 401 in the environmental condition table 400 which the environment determination portion 203 has referred to. As the result of the checking, if the obtained environment information corresponds to any of the registered environment information 401 in the environmental condition table 400, the environment determination portion 203 counts the duration for which the condition indicated by this corresponding environment information continues, by use of a specific clock portion 203b (for example, real time clock) provided in advance. Then, the environment determination portion 203 determines whether the counted duration satisfies the registration duration 402 for the registered environment information 401. That is, based on the obtained environment information and the environmental condition table 400, the environment determination portion 203 determines whether the condition indicated by the registered environment information 401 (specific environment) has continued for the registration duration 402 (specific period) corresponding thereto. It should be noted that the clock portion 203b is mounted on the control circuit in the control portion 201.

Figure 3:
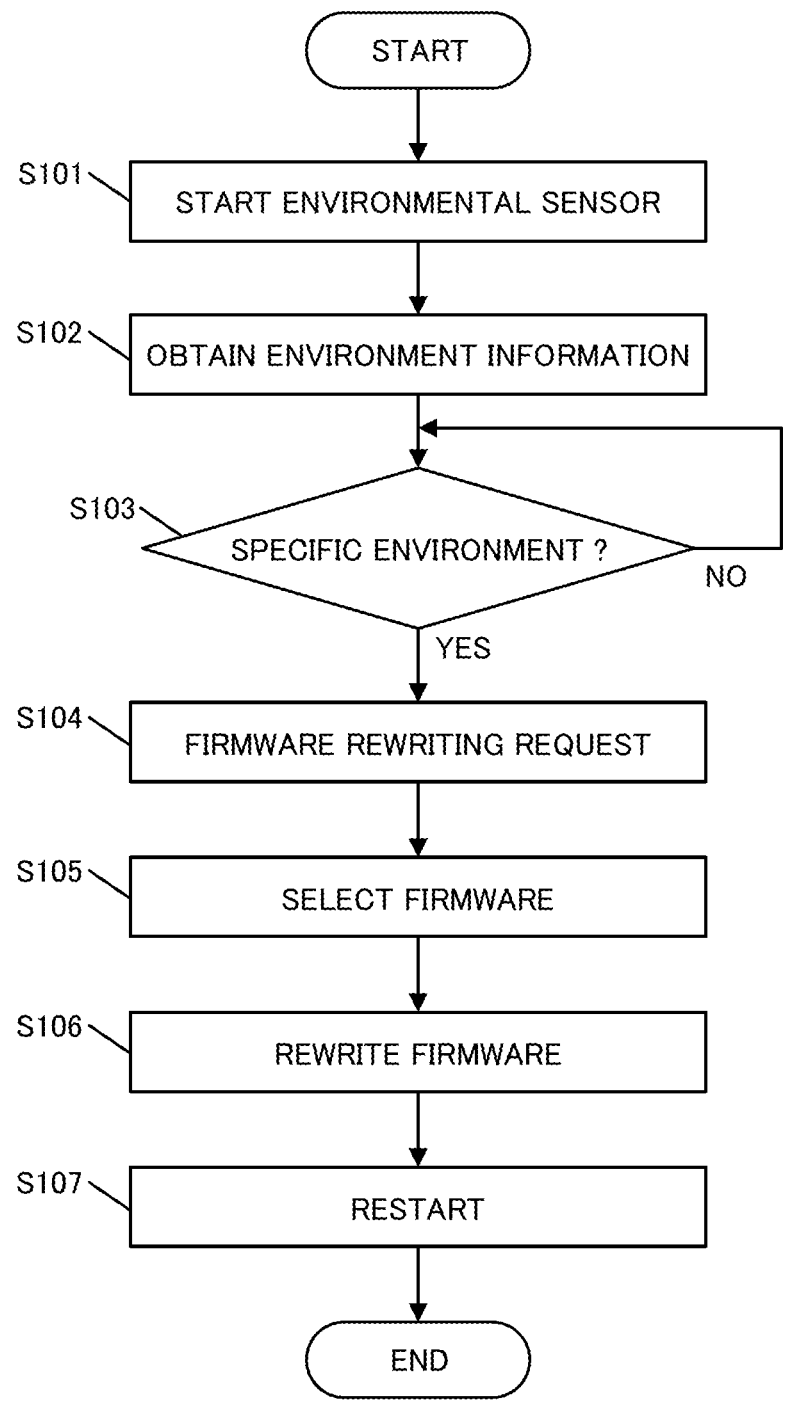
FIG. 3 is a flow chart showing an execution procedure performed in the embodiment of the present disclosure.

In S103, if the obtained environment information does not correspond to any of the registered environment information 401 in the environmental condition table 400, or if the counted duration does not satisfy the registration duration 402 for the registered environment information 401 (FIG. 3: S103, NO), the environment determination portion 203 determines that the specific environment has not continued for the specific period. Then, upon receiving new environment information, the environment determination portion 203 makes the determination described above again in S103. Accordingly, the environment information from the environmental sensor 101 can be always monitored.

Meanwhile, in S103, if the counted duration satisfies the registration duration 402 for the registered environment information 401 (FIG. 3: S103, YES), the environment determination portion 203 determines that the current environment is the specific environment indicated by the registered environment information 401. Specifically, the environment determination portion 203 determines that the condition indicated by the registered environment information 401 has continued for the registration duration 402 corresponding thereto. Then, the environment determination portion 203 obtains, an ID 403 ("A", for example) indicating the continued specific environment, and notifies a firmware selection portion 204 of a firmware rewriting request that corresponds to the ID 403 ("A") (FIG. 3: S104). Then, the firmware selection portion 204 shifts to a firmware rewriting mode, and selects firmware that corresponds to the identification information, based on the ID 403 ("A") associated with the registered environment information 401 and on a firmware table 404 (FIG. 3: S105).

There is no limitation in particular to how the firmware selection portion 204 makes the selection. For example, the firmware selection portion 204 refers to the firmware table 404 stored in advance in the storage portion 203a. In the firmware table 404, as shown in FIG. 4B, each ID 405 indicating an environmental condition of a specific environment, and firmware 406 corresponding to the environmental condition of the ID 405 are stored in advance. The storage portion 203a is a non-volatile memory, for example, and each firmware 406 is stored in advance in the non-volatile memory so that the image forming apparatus 100 need not download the firmware 406. Each firmware 406 is firmware specialized for its corresponding environmental condition. Under an abnormal environment, dedicated firmware that is to be used under the environment and that includes the correction control function is stored, and under a normal environment, normal firmware is stored. Then, the firmware selection portion 204 checks the ID ("A") which corresponds to the satisfied environmental condition against an ID 405 in the firmware table 404, and selects firmware 406 ("aaa") that corresponds to the ID 405 against which the checking has been performed.

Upon completion of the selection, the firmware selection portion 204 notifies a firmware rewriting portion 205 that the firmware selection portion 204 has completed the selection, and the firmware rewriting portion 205 having received the notification rewrites the currently-used firmware with the selected firmware (FIG. 3: S106), and executes restart (FIG. 3: S107). It should be noted that the currently-used firmware is stored in a specific memory in the control portion 201, for example. This firmware is rewritten with the selected firmware.

Here, there is no limitation in particular with respect to the timing at which the firmware rewriting portion 205 performs the rewriting. For example, when the user is using the image forming apparatus 100, the firmware rewriting portion 205 does not execute the rewriting, and at the timing when the use of the image forming apparatus 100 is completed, or at the timing when the image forming apparatus 100 has shifted from a normal state to a sleep state after having been left in a non-operation state, the firmware rewriting portion 205 executes the rewriting of the firmware and executes restart. Accordingly, without hindering the use of the image forming apparatus 100 by the user, rewriting of the firmware can be executed.

Meanwhile, if the environmental condition has become consistent with a condition indicated by a specific environment, the user may download the dedicated firmware to the image forming apparatus 100, but once the environmental condition has become consistent with a condition indicated by a normal environment, the user has to return the dedicated firmware to the regular firmware. In such a case, if the user does not return the dedicated firmware to the regular firmware, the image forming apparatus 100 may be adversely influenced. In order to solve such a problem, the image forming apparatus 100 of the present embodiment is configured so as to be able to execute rewriting into appropriate firmware, in accordance with change in the environmental condition.

For example, in the low temperature environment corresponding to the ID ("A"), fogging tends to occur in the image forming apparatus 100. Thus, by causing the dedicated firmware ("aaa") that corresponds to this low temperature environment to include a control function for correcting the fogging, it is possible to provide a printed object having constant quality, without causing fogging even in the low temperature environment. This also applies to other environments. Accordingly, it becomes possible to automatically perform rewriting into appropriate firmware in accordance with change in the environmental condition. This eliminates the need for the manufacturer or the user to perform downloading work or the like in accordance with change in the environmental condition, and thus, it is possible to omit the onerous work of rewriting firmware that might be required every time environment has changed.

When the environmental condition of the image forming apparatus 100 has changed to have normal temperature and normal humidity for some reason, the dedicated firmware is to be automatically rewritten with the normal firmware. That is, the environment obtaining portion 202 obtains environment information that corresponds to the normal temperature and the normal humidity, and the environment determination portion 203 determines, based on the environmental condition table, whether the obtained environment information corresponds to normal registered environment information indicating a normal environment such as normal temperature, normal humidity, and the like. Then, if the environment information corresponds to the normal registered environment information, the firmware selection portion 204 selects, based on the firmware table 404 and on an ID 403 associated with the normal registered environment information, normal firmware that corresponds to the ID 403. Then, the firmware rewriting portion 205 rewrites the dedicated firmware with the normal firmware, and executes restart. In this manner, even when the abnormal environment has returned to the normal environment, the performance of the machine can be maintained. In particular, even after the abnormal environment of the image forming apparatus 100 using the dedicated firmware has returned to the normal environment, if the image forming apparatus 100 continuously uses the dedicated firmware, the respective portions of the image forming apparatus 100 may be damaged. In the embodiment of the present disclosure, it is possible to assuredly prevent damage of the image forming apparatus 100 that could be caused by forgetting to update the dedicated firmware with the normal firmware.

In the embodiment of the present disclosure, in the case where the obtained environment information satisfies specific registered environment information 401, and where the duration for which the condition indicated by the environment information has continued satisfies the registration duration 402 associated with the registered environment information 401, the environment determination portion 203 determines that the current environment is the specific environment. However, another configuration may be employed. For example, the environment determination portion 203 may determine that the current environment is the specific environment in consideration of the season (summer, winter, or the like). In the environmental condition table 400, the registered environment information 401, the registration duration 402, and further, registration time indicating specific time are stored in association with one another. This registration time corresponds to season, and for example, if it is summer, the registration time corresponds to June to August, and if it is winter, the registration time corresponds to December to February. Next, the environment determination portion 203 obtains the current date from the clock portion (RTC) provided in advance, and determines whether the obtained date is included in the registration time. Then, if the obtained environment information satisfies specific registered environment information, the duration for which the condition indicated by the environment information has continued satisfies a registration duration associated with the registered environment information, and the obtained current date is included in the registration time, it is determined that the current environment is the specific environment. Accordingly, it is possible to realize rewriting of firmware in consideration of the season, and it is possible to prevent wrong rewriting of the firmware which is only based on the environmental sensor 101.

In the embodiment of the present disclosure, the environment obtaining portion 202 obtains only the environment information provided from the environmental sensor 101. However, another configuration may be employed. For example, the environment obtaining portion 202 obtains the fixing temperature at the fixing portion and a return time period which is the time period from start of a sleep state until cancellation of the sleep state. Then, the environment determination portion 203 determines whether the obtained fixing temperature satisfies a registered fixing temperature which has been registered in advance, and determines whether the obtained return time period satisfies a registered return time period which has been registered in advance. Then, if the environment information satisfies the registered environment information, the duration for which the condition indicated by the environment information has continued satisfies the registration duration, the fixing temperature satisfies the registered fixing temperature, and the return time period satisfies the registered return time period, it is determined that the current environment is the specific environment. Accordingly, for example, it is possible to accurately perform rewriting of firmware, in accordance with the actual state, i.e., whether the environment is appropriately air-conditioned and is close to the normal environment, or whether the environment is not air-conditioned and is likely to change into the abnormal environment.

In the embodiment of the present disclosure, the environmental condition table 400 is configured such that registered environment information 401 is stored in association with a registration duration 402 and an ID 403. However, another configuration may be employed. For example, as long as the obtained environment information is included in registered environment information indicating an abnormal environment having high temperature, high humidity, and the like, rewriting of the firmware may be executed in principle, irrespective of the duration, and thus, the environmental condition table 400 may be configured such that registered environment information 401 is stored in association with an ID 403. In this case, the environment determination portion 203 determines whether the obtained environment information corresponds to the registered environment information 401. If the environment information corresponds to the registered environment information 401, the firmware selection portion 204 selects, based on the firmware table 404 and on the ID 403 associated with the registered environment information 401, firmware 406 that corresponds to the ID 403. Accordingly, the process can be simplified.

In the embodiment of the present disclosure, it is assumed that the environment determination portion 203 is implemented by an engine CPU, and that the firmware selection portion 204 and the firmware rewriting portion 205 are implemented by a main CPU. However, another configuration may be employed.

In the embodiment of the present disclosure, the image forming apparatus 100 includes the respective portions. However, a configuration may be employed in which a program realizing the respective portions is stored in a non-transitory computer-readable storage medium and the non-transitory computer-readable storage medium is provided. In this configuration, the image forming apparatus is caused to read the program, and the image forming apparatus realizes the respective portions. In that case, the program itself, having been read from the non-transitory computer-readable storage medium, exhibits the effects of the present disclosure. Further, the present disclosure may be provided as a method for storing, in a hard disk, steps to be executed by the respective portions.

As described above, the image forming apparatus according to the present disclosure is useful for MFPs, copying machines, printers, and the like, and is effective as an image forming apparatus that can perform rewriting into appropriate firmware in accordance with change in the environmental condition.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   an environment obtaining portion configured to obtain, from an environmental sensor, environment information regarding an ambient environment of the image forming apparatus;
   a storage portion in which an environmental condition table and a firmware table are stored, the environmental condition table being a table in which, in association with registered environment information indicating a specific environment, identification information for identifying the specific environment is stored, the firmware table being a table in which, in association with the identification information, firmware that corresponds to an environmental condition indicated by the identification information is stored;
   an environment determination portion configured to determine, based on the environmental condition table, whether the obtained environment information corresponds to the registered environment information;
   a firmware selection portion configured to, based on the firmware table and on the identification information associated with the registered environment information, select firmware that corresponds to the identification information, when the environment information corresponds to the registered environment information; and
   a firmware rewriting portion configured to rewrite currently-used firmware with the selected firmware and to execute restart, wherein
   in the environmental condition table, a registration duration indicating a period for which a condition indicated by the registered environment information has continued is stored in association with the registered environment information, and
   the environment determination portion determines whether the obtained environment information corresponds to the registered environment information and a duration for which a condition indicated by the environment information has continued satisfies a registration duration that corresponds to the registered environment information, and
   the firmware selection portion selects firmware that corresponds to the identification information when the environment information corresponds to the registered environment information and the duration satisfies the registration duration.

2. The image forming apparatus according to claim 1, wherein in the environmental condition table, a registration time indicating a specific time is stored in association with the registered environment information, the environment determination portion determines whether the environment information corresponds to the registered environment information, the duration satisfies the registration duration, and a current date is included in a registration time that corresponds to the registered environment information, and the firmware selection portion selects firmware that corresponds to the identification information, when the environment information corresponds to the registered environment information, the duration satisfies the registration duration, and the current date is included in the registration time that corresponds to the registered environment information.

* * * * *